(12) United States Patent
Fukasawa et al.

(10) Patent No.: US 8,907,989 B2
(45) Date of Patent: Dec. 9, 2014

(54) DISPLAY CONTROL APPARATUS AND DISPLAY CONTROL METHOD

(75) Inventors: Toshihiko Fukasawa, Machida (JP); Motoo Ohnishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 585 days.

(21) Appl. No.: 13/226,854

(22) Filed: Sep. 7, 2011

(65) Prior Publication Data
US 2012/0062600 A1 Mar. 15, 2012

(30) Foreign Application Priority Data

Sep. 13, 2010 (JP) ................................. 2010-204365

(51) Int. Cl.
*G09G 5/00* (2006.01)
*G06K 9/00* (2006.01)

(52) U.S. Cl.
CPC ................................. *G06K 9/00771* (2013.01)
USPC ....................................................... 345/660

(58) Field of Classification Search
USPC ........................................................ 345/660
See application file for complete search history.

(56) References Cited

U.S. PATENT DOCUMENTS

| 5,442,397 | A | 8/1995 | Yoshimura et al. | |
|---|---|---|---|---|
| 6,079,862 | A * | 6/2000 | Kawashima et al. | 382/103 |
| 7,113,616 | B2 * | 9/2006 | Ito et al. | 382/103 |
| 7,200,246 | B2 * | 4/2007 | Cofer et al. | 382/103 |
| 7,292,240 | B2 * | 11/2007 | Okuno et al. | 345/419 |
| 7,796,540 | B2 * | 9/2010 | Arai et al. | 370/254 |
| 8,089,455 | B1 * | 1/2012 | Wieder | 345/156 |
| 8,135,172 | B2 * | 3/2012 | Ike et al. | 382/103 |
| 8,463,044 | B2 * | 6/2013 | Meng et al. | 382/190 |
| 8,467,572 | B2 * | 6/2013 | Park et al. | 382/103 |
| 8,472,667 | B2 * | 6/2013 | Suzuki | 382/103 |
| 8,577,151 | B2 * | 11/2013 | Hu | 382/195 |
| 8,659,548 | B2 * | 2/2014 | Hildreth | 345/158 |
| 2003/0117516 | A1 * | 6/2003 | Ishida et al. | 348/348 |
| 2007/0127819 | A1 * | 6/2007 | Lee et al. | 382/190 |
| 2008/0218595 | A1 * | 9/2008 | Kawahara | 348/222.1 |

(Continued)

FOREIGN PATENT DOCUMENTS

| CN | 1543742 A | 11/2004 |
|---|---|---|
| CN | 1759329 A | 4/2006 |
| CN | 101021949 A | 8/2007 |
| JP | 2000-125744 A | 5/2000 |

OTHER PUBLICATIONS

Zhang et al.; "Moving Object Detection and Tracing for Human-body"; Shenyang Architectural and Civil Engineering Institute, Oct. 2007; pp. 102-105.

Li et al.; "Algorithm for Automatic License Plate Recognition System;" Digital Engineering & Emulation Research Center, Huazhong University of Science & Technology; Wuhan Hubei, 430074; China ; 2006; pp. 8/15-11/15.

(Continued)

*Primary Examiner* — Ryan R Yang
(74) *Attorney, Agent, or Firm* — Canon USA, Inc. IP Division (57) ABSTRACT

A processing apparatus configured to output an event according to a result of comparison between a size of an object detected within an object detection region of a video image and a threshold value includes a setting unit configured to set the object detection region, a determination unit configured to determine the threshold value based on a size of the set object detection region, and a display control unit configured to cause a detection region figure indicating the object detection region, and a detection size figure with a size corresponding to the determined threshold value to be superimposed on the video image.

17 Claims, 4 Drawing Sheets

(56) References Cited

U.S. PATENT DOCUMENTS

| | | | |
|---|---|---|---|
| 2009/0220123 A1* | 9/2009 | Tojo et al. | 382/103 |
| 2009/0256933 A1* | 10/2009 | Mizukami | 348/240.1 |
| 2010/0231731 A1* | 9/2010 | Motomura et al. | 348/208.4 |
| 2010/0253779 A1* | 10/2010 | Itoh et al. | 348/143 |
| 2010/0272366 A1* | 10/2010 | Meng et al. | 382/190 |
| 2011/0043681 A1* | 2/2011 | Shibagami | 348/349 |
| 2011/0211233 A1* | 9/2011 | Yokono | 358/474 |

OTHER PUBLICATIONS

U.S. Appl. No. 13/212,546, filed Aug. 18, 2011.
U.S. Appl. No. 13/212,619, filed Aug. 18, 2011.
Li Xiao Ling; "Dynamic Image Recognition Monitoring System for Oil Field Production;" Journal of Southwest Petroleum University (Science & Technology Edition), vol. 31, No. 2, Apr. 2009; pp. 155-158.

* cited by examiner

DISPLAY CONTROL APPARATUS AND DISPLAY CONTROL METHOD

BACKGROUND OF THE INVENTION

1. Field of the Invention

The present invention relates to a user interface for setting of an object detection function of detecting an object within a video image.

2. Description of the Related Art

Conventionally, there exists a monitoring system utilizing an object detection function for detecting and recognizing an object within a video image by image processing. For example, Japanese Patent Application Laid-Open No. 2000-125744 discusses a method for detecting and distinguishing a human object from a small animal as a menacing target, by comparing the size (number of pixels) of a detected object with a threshold value set in advance.

However, depending on an object that should be detected, sometimes it may become difficult to detect the object.

For example, in a case where a standing height is set for detecting a human object, sometimes troublesome conversions in consideration of optical characteristics of cameras, such as zoom magnification, may be needed.

Further, for example, in a case where a camera is installed on a ceiling, it may become difficult to detect a particular human object based on a standing height, depending on an installed position of the camera or an imaging direction.

SUMMARY OF THE INVENTION

The present invention is directed to an object detection function capable of easily detecting a target object.

According to an aspect of the present invention, a processing apparatus configured to output an event according to a result of comparison between a size of an object detected within an object detection region of a video image and a threshold value includes a setting unit configured to set the object detection region, a determination unit configured to determine the threshold value based on a size of the set object detection region, and a display control unit configured to cause a detection region figure indicating the object detection region, and a detection size figure with a size corresponding to the determined threshold value to be superimposed on the video image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

DESCRIPTION OF THE EMBODIMENTS

Various embodiments, features, and aspects of the invention will be described in detail below with reference to the drawings.

Figure 1:
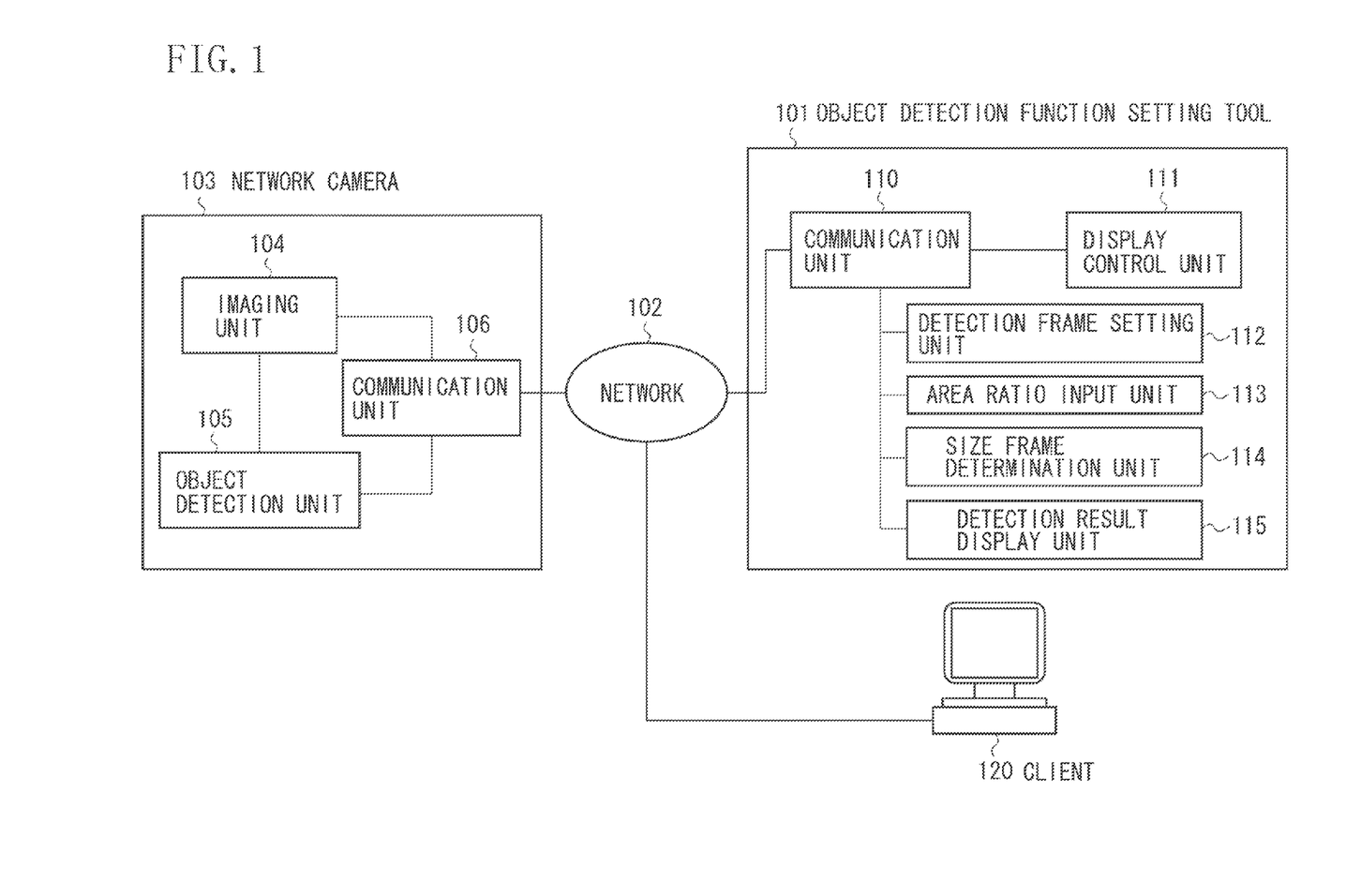
FIG. 1 is a software configuration diagram of an object detection system according to an embodiment of the present invention.

FIG. 1 is a software configuration diagram of an object detection system that provides an object detection function according to an embodiment of the present invention.

In FIG. 1, the object detection system includes an object detection function setting tool 101, a network 102, a network camera 103, and a client 120. The object detection function setting tool 101 is a display control apparatus that displays a video image corresponding to the video data from the network camera 103 and provides a setting user interface for the purpose of object detection. The network 102 is a network enabling an Internet Protocol (IP)-based communication such as a local area network (LAN) or the Internet.

The network camera 103 has a video imaging function and an object detection function, and delivers live images and detected object information relating to the detected objects to the object detection function setting tool 101 and the client 120 via the network 102. The object detection function setting tool 101 and the client 120 display video images corresponding to the video data and detection results corresponding to the detected object information delivered from the network camera 103. The network camera 103 includes an imaging unit 104, an object detection unit 105, and a communication unit 106.

The imaging unit 104 acquires live images by an imaging device. The imaging unit 104 is capable of acquiring live images equivalent to, for example, 30 frames per second. The imaging unit 104 according to the present embodiment offers also a function of converting the live images acquired from the imaging device into digital video data that can be delivered via the network in Joint Photographic Experts Group (JPEG) mode or the like.

The object detection unit 105 analyzes the video data acquired by the imaging unit 104, and detects an object with a size equal to or greater than a predetermined size. The size of the object detected by the object detection unit 105 will be described below. The data of the detected object is notified to the object detection function setting tool 101 or the client 120 as detected object information.

The detected object information is composed of a video data number, an object number, and object position/size information.

The video data number is information for identifying a frame of the object detected by the object detection unit 105. The client 120 and the object detection function setting tool 101 can identify a frame in which the object is detected, based on the video data number contained in the detected object information.

The object number is a number assigned to each object by the object detection unit 105 for identifying the detected object.

The object position/size information is information representing a position and size within the video image of the detected object. These pieces of information are expressed by coordinates with an origin point at a top-left corner of the video image.

The object detection unit 105 according to the present embodiment performs object detection by analyzing a difference between consecutive video frames. However, as an object detection algorithm, it is possible to use various methods such as, for example, a method for analyzing a difference between the video data obtained by an imaging operation and a preset reference video image.

The communication unit 106 transmits the video data acquired by the imaging unit 104 and the detected object information generated by the object detection unit 105 to the client 120 and the object detection function setting tool 101 via the network 102. Further, the communication unit 106 receives detection setting information which a user has set by using the object detection function setting tool 101, and sets it for the object detection unit 105. The detection setting information is information relating to the size or shape of an object to be detected, and is information to be determined based on a user input. The details of detection setting information will be described below. The object detection function setting tool 101 includes a communication unit 110, a display control unit 111, a detection frame setting unit 112, an area ratio input unit 113, a size frame determination unit 114, and a detection result display unit 115.

The communication unit 110 receives the video data and the detected object information transmitted from the network camera 103. Further, the communication unit 110 transmits the detection setting information, which the user has set by using the object detection function setting tool 101, to the network camera 103.

The display control unit 111 displays video images corresponding to the video data delivered from the network camera 103 on a display apparatus such as a display.

The detection frame setting unit 112 sets an object detection region on a video image. The object detection region is a region within the video image, and is a region where an object is detected. In other words, only a portion of the video image (for example, near doorway) rather than the entire video image can be rendered as a target of the object detection, by setting the object detection region. Accordingly, enhancement of detection accuracy of objects, or reduction in processing loads can be expected. The detection frame setting unit 112 causes the display control unit 111 to display a frame indicating the object detection region on the video image.

The area ratio input unit 113 inputs a parameter indicating a size of an area relative to an area of the object detection region into the size frame determination unit 114. That is, the area ratio input unit 113 inputs a ratio of an area of an object to be detected to an area of the object detection region displayed within the video image. In the present embodiment, an example in which a ratio to be input is indicated in percentage will be described. For example, the area ratio input unit 113 inputs 25% as a ratio of an area of the detected object to an area of the object detection region. The user can input an arbitrary value as the ratio.

The size frame determination unit 114 determines size information of an object to be detected within the object detection region, based on the area of the object detection region set by the detection frame setting unit 112, and the ratio input by the area ratio input unit 113. For example, in a case where 25% is input by the area ratio input unit 113, ¼ of an area of the object detection region is determined as size information. In this case, an object having an area equal to or greater than ¼ of the area of the object detection region becomes a detection target. That is, the size frame determination unit 114 sets an object having an area larger than the threshold value (size information) corresponding to the area (size) of the object detection region and the ratio so as to be a detection target. Alternatively, the size frame determination unit 114 can set an object having an area smaller than the threshold value corresponding to the area of the object detection region multiplied by the ratio so as to be a detection target.

The display control unit 111 causes a video image from the network camera 103 to be displayed on a video image display region 302. Further, the display control unit 111 causes a frame of the object detection region (a detection region frame 303), an input frame of a ratio of areas (an area ratio input field 305), and a figure indicating the size of an object to be detected (a detection size frame 304) to be displayed within the video image display region 302. A display example by the display control unit 111 will be described below with reference to FIG. 3.

Figure 3:
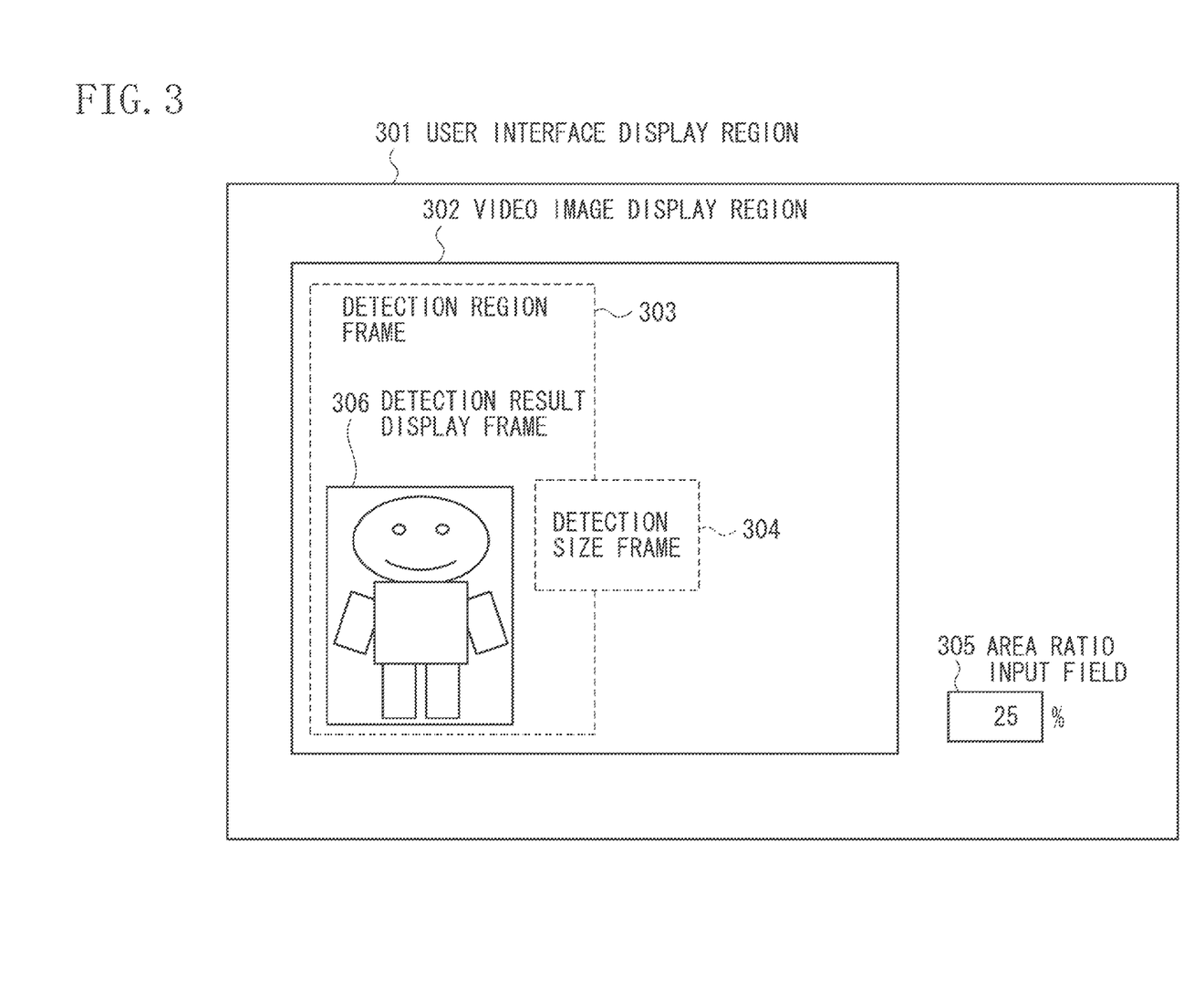
FIG. 3 illustrates a user interface according to the embodiment of the present invention.

The object detection unit 105 compares a size of an object detected within an object detection region of a video image with the threshold value determined by the size frame determination unit 114. The detection result display unit 115 outputs an event according to a result by the object detection unit 105. For example, the detection result display unit 115 causes a detection result display frame 306 corresponding to a detection result by the object detection unit 105 of the network camera 103 to be displayed via the display control unit 111.

The client 120 has a function of receiving the video data and the detected object information from the network camera 103, and displaying the detection result and the video image of the object. Thus, the client 120 includes the communication unit 110, the display control unit 111, and the detection result display unit 115, of the object detection function setting tool 101, and does not include the detection frame setting unit 112, the area ratio input unit 113, and the size frame determination unit 114. In other words, the object detection function setting tool 101 differs from the client 120 in that the object detection function setting tool 101 is able to set an object detection region and a detection size (size information) of the object.

Figure 2:
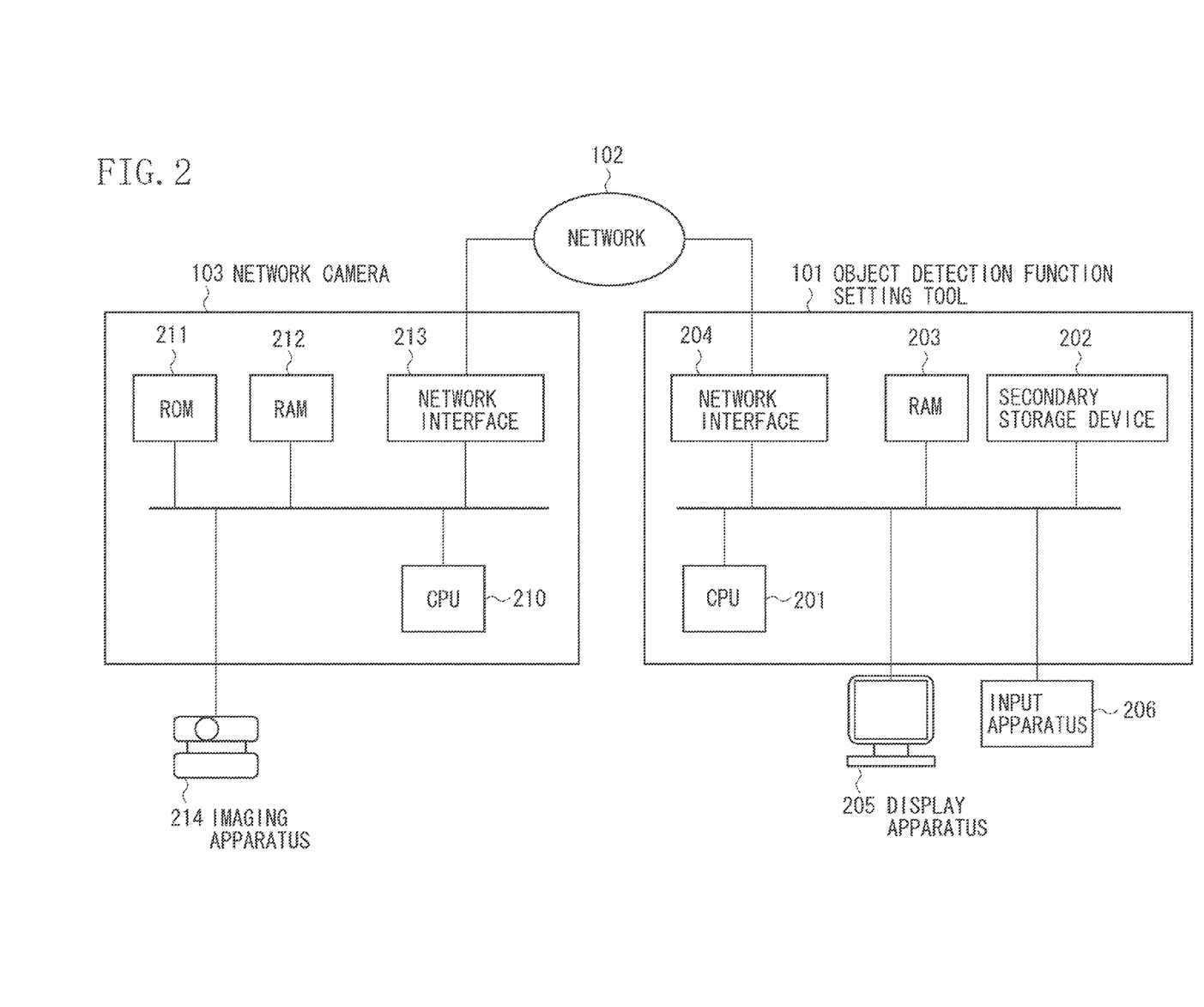
FIG. 2 is a hardware configuration diagram of the object detection system according to the embodiment of the present invention.

FIG. 2 illustrates hardware configurations of the object detection function setting tool 101 and the network camera 103. A hardware configuration of the client 120 is similar to that of the object detection function setting tool 101. In FIG. 2, a central processing unit (CPU) 201 is a control processing device that comprehensively controls the object detection function setting tool 101.

A secondary storage device 202 stores a program for causing the CPU 201 to control the object detection function setting tool 101. A random access memory (RAM) 203 is a memory for causing the CPU 201 to load the program read out from the secondary storage device 202 and to execute processing. Also, the RAM 203 is used as a storage area for temporarily storing data which will become targets of various types of processing as a temporary storage memory.

A network interface 204 is a circuit that performs communication via the network 102. The network interface 204 is used when reception of the video data and the detected object information from the network camera 103 and transmission of the detection setting information are performed.

A display apparatus 205 is a display device such as a display that displays a video image corresponding to the video data. The object detection function setting tool 101 may be an apparatus integral with the display apparatus 205. An input apparatus 206 is a keyboard or a mouse or the like. However, the input apparatus 206 may include, for example, a joystick or an audio input apparatus.

The object detection function setting tool 101 can be mounted as software operating on a general personal computer (PC). In the present embodiment, an example in which the CPU 201 reads out the program from the secondary storage device 202 and executes the processing has been described. However, at least a portion out of respective processing of respective units in FIG. 1 may be performed by dedicated hardware.

Next, the hardware configuration of the network camera 103 will be described. In FIG. 2, the CPU 210 is a control unit that comprehensively controls the network camera 103.

A read-only memory (ROM) 211 stores a program for causing the CPU 210 to control the network camera 103. A secondary storage device equivalent to the secondary storage device 202 may be used in lieu of the ROM 211. The RAM 212 is a memory for loading a program read out from the ROM 211 and executing the processing. Also, the RAM 212 is used as a storage area for temporarily storing the data which will become the targets of various types of processing as a temporary storage memory.

The network interface 213 is a circuit that performs communication via the network 102. The network interface 213 is used for transmission of the video data and the detected object information to the object detection function setting tool 101 and reception of the detection setting information.

An imaging apparatus 214 has an imaging device, and uses a video camera or the like that captures a live image as a moving image and a still image. The network camera 103 and the imaging apparatus 214 may be an integral apparatus, or may be separate apparatuses.

Next, with reference to FIG. 3, a user interface of the object detection function setting tool 101 will be described. The object detection function setting tool 101 is a display control apparatus that causes the video image from the network camera 103 to be displayed on the display apparatus 205. The user interface illustrated in FIG. 3 is displayed on a screen of the display apparatus 205 in FIG. 2 by the display control unit 111 in FIG. 1. The object detection function setting tool 101 and the display apparatus 205 may be an integral apparatus, or may be separate apparatuses.

In FIG. 3, a user interface display region 301 represents a display region on a display of the display apparatus 205. It is possible to configure the user interface display region 301 as the entire display, or as one window.

A video image display region 302 is a region for displaying a video image (live image) corresponding to the video data delivered from the network camera 103.

A detection region frame 303 is a frame indicating a region which becomes a target of object detection processing of the object detection unit 105. In the present embodiment, an example of displaying the detection region frame 303 in a rectangular form will be described, but for example, the detection region frame 303 in a polygonal or circular or elliptical form may be set. The detection region frame 303 is displayed by the display control unit 111 based on settings of the detection frame setting unit 112.

The detection frame setting unit 112 changes a size of the detection region frame 303 by a user selecting a corner or a side of the detection region frame 303 being displayed by using the input apparatus 206 such as a mouse, and directly dragging it. In addition, the detection frame setting unit 112 changes a position of the detection region frame 303 by a user selecting the detection region frame 303 being displayed by using the input apparatus 206 such as a mouse, and directly dragging it. In this way, the detection frame setting unit 112 changes a position or a size of the object detection region within the video image according to an input from the input apparatus 206.

An area ratio input field 305 is a user interface for inputting a ratio in percentage of an area of a detection target object to an area of the detection region frame 303. In the present embodiment, a case of inputting the ratio in percentage will be described, but it is also possible to input the ratio in fraction (e.g., ¼), or in decimal (e.g., 0.25). The area ratio input unit 113 inputs a parameter input via the area ratio input field 305, into the size frame determination unit 114. In the present embodiment, descriptions with a focus on an example of inputting a numerical value into the area ratio input field 305 has been given. However, a configuration for allowing a user to select, for example, "same as the detection region frame 303" or "slightly smaller than the detection region frame 303" or "half of the detection region frame 303" may be acceptable.

The detection size frame 304 is a frame indicating a minimal size of an object which becomes a target of the object detection processing of the object detection unit 105. In the present embodiment, descriptions with a focus on an example of displaying the detection size frame 304 in rectangular form will be given, but it is also possible to display the detection size frame 304, for example, in a polygonal or a circular or elliptical form. An area of the detection size frame 304 is determined by the size frame determination unit 114, as a product of an area of the detection region frame 303 set by the detection frame setting unit 112, and a parameter input by the area ratio input unit 113. Thus, the size frame determination unit 114 determines size information (a threshold value) of an object to be detected within the object detection region, based on the area of the object detection region and the input parameter (ratio). The object detection unit 105 detects an object having an area larger than the size information (threshold value) determined by the size frame determination unit 114. In the present embodiment, descriptions with a focus on an example of detecting an object larger than the threshold value will be given. Conversely, however, it would be possible to detect an object smaller than the threshold value.

The size frame determination unit 114 according to the present embodiment causes the detection size frame 304 with the same aspect ratio as that of the video image display region 302 to be displayed. However, the present embodiment is not limited to this form, and for example, a shape of the detection size frame 304 may be a rectangle with the same aspect ratio as that of the detection region frame 303. In FIG. 3, the detection size frame 304 is displayed to lie off the detection region frame 303, but the detection size frame 304 may be displayed to fit inside the detection region frame 303. If a shape of the detection region frame 303 is a polygon, a circle, or an ellipse, the size frame determination unit 114 can determine a shape of the detection size frame 304 to be a shape corresponding to the video image display region 302 or the detection region frame 303. Also, it is possible to allow the user to arbitrarily designate a shape of the detection size frame 304. In this case, it would be convenient to display a template indicating plural shapes, and enable the user to designate a desired shape by using the input apparatus 206 (e.g., mouse).

Further, the shape of the detection size frame 304 may be automatically set depending on installation modes of the imaging apparatus 214. For example, in the case of detecting persons, the detection size frame 304 may be set as an elliptical shape when the imaging apparatus 214 hung from a ceiling shoots directly downward, and the detection size frame 304 may be set as a vertically long rectangular shape when the imaging apparatus 214 hung on a wall shoots from the side. In this case, the object detection function setting tool 101 has an installation mode determination unit (not illustrated) that determines an installation mode of the network camera 103. The installation mode determination unit acquires the installation mode from the network camera 103. Then, the display control unit 111 causes a figure (the detection size frame 304) of an area determined by the size frame determination unit 114 to be displayed in a shape corresponding to a determination result by the installation mode determination unit. The shape of the detection size frame 304 can be also changed by a manipulation of a mouse or the like, but the shape of the detection size frame 304 can be varied depending on the installation mode of the imaging apparatus 214.

Also, it is possible to change the shape of the detection size frame 304 once set. It is also possible to display a template for visually selecting a desired shape from among, for example, plural shapes and to change the shape of the detection size frame 304, based on the selection result. Also, it is possible to change the shape of the detection size frame 304 of the shape selected using the template, by dragging operation or the like. Also, it is possible to enable manual or automatic settings of fill or color inside the detection size frame 304.

The display control unit 111 according to the present embodiment changes an area (size information) of the detection size frame 304 according to a change of an area of the detection region frame 303, by operation of a corner or side of the detection region frame 303, or a change of an area ratio to be input into the area ratio input field 305. Thus, when a change of the area of the detection region frame 303 by operation of the input apparatus 206 or a change of a parameter of the area ratio occurs, the size frame determination unit 114 determines size information of the object after the change. Then, the display control unit 111 causes a figure of an area corresponding to the size information, which the size frame determination unit 114 has newly determined, to be displayed as the detection size frame 304. The size frame determination unit 114 according to the present embodiment determines, as the size information, a product of the area of the detection region frame 303 and the parameter of the area ratio input into the area ratio input field 305.

On the other hand, it is possible to change an area of the detection region frame 303, as well as an area of the detection size frame 304, according to a change of the area of the detection size frame 304 based on adjustments made to the corner or side of the detection size frame 304 by a user. Even if the area of the detection size frame 304 is changed by operation of the corner or side of the detection size frame 304, an area ratio displayed in the area ratio input field 305 may be changed, without changing the area of the detection region frame 303.

Further, the display control unit 111 can display the detection size frame 304 in the middle of the video image display region 302, and display it in the middle of the detection region frame 303. The display control unit 111 according to the present embodiment, in a case where the detection size frame 304 is displayed in the middle of the detection region frame 303, moves a display position of the detection size frame 304, according to a change of the position of the detection region frame 303. Further, the display control unit 111 according to the present embodiment, when an area or shape of the detection size frame 304 is set (or changed), causes the detection size frame 304 to be displayed for a fixed length of time. The display time of the detection size frame 304 is an adequate time for the user to recognize a size of the detection size frame 304, and to perform a change operation of size when needed. If the user is allowed to arbitrarily set the display time, it is possible to establish specifications that suit the user's preferences.

The detection result display frame 306 is a frame for indicating a region of an object detected by the object detection unit 105 of the network camera 103. In FIG. 3, a rectangular frame allowing the detected object to fit inside thereof is displayed, but a shape of the detection result display frame 306 may be a polygon, a circle, or an ellipse. The display control unit 111 according to the present embodiment, while the detection result display frame 306 is being displayed, sets the detection size frame 304 to a non-display mode. In this way, in particular, in a form of causing the detection size frame 304 to be displayed in the middle of the detection region frame 303, the user can be prevented from confusing the detection result display frame 306 and the detection size frame 304.

Figure 4:
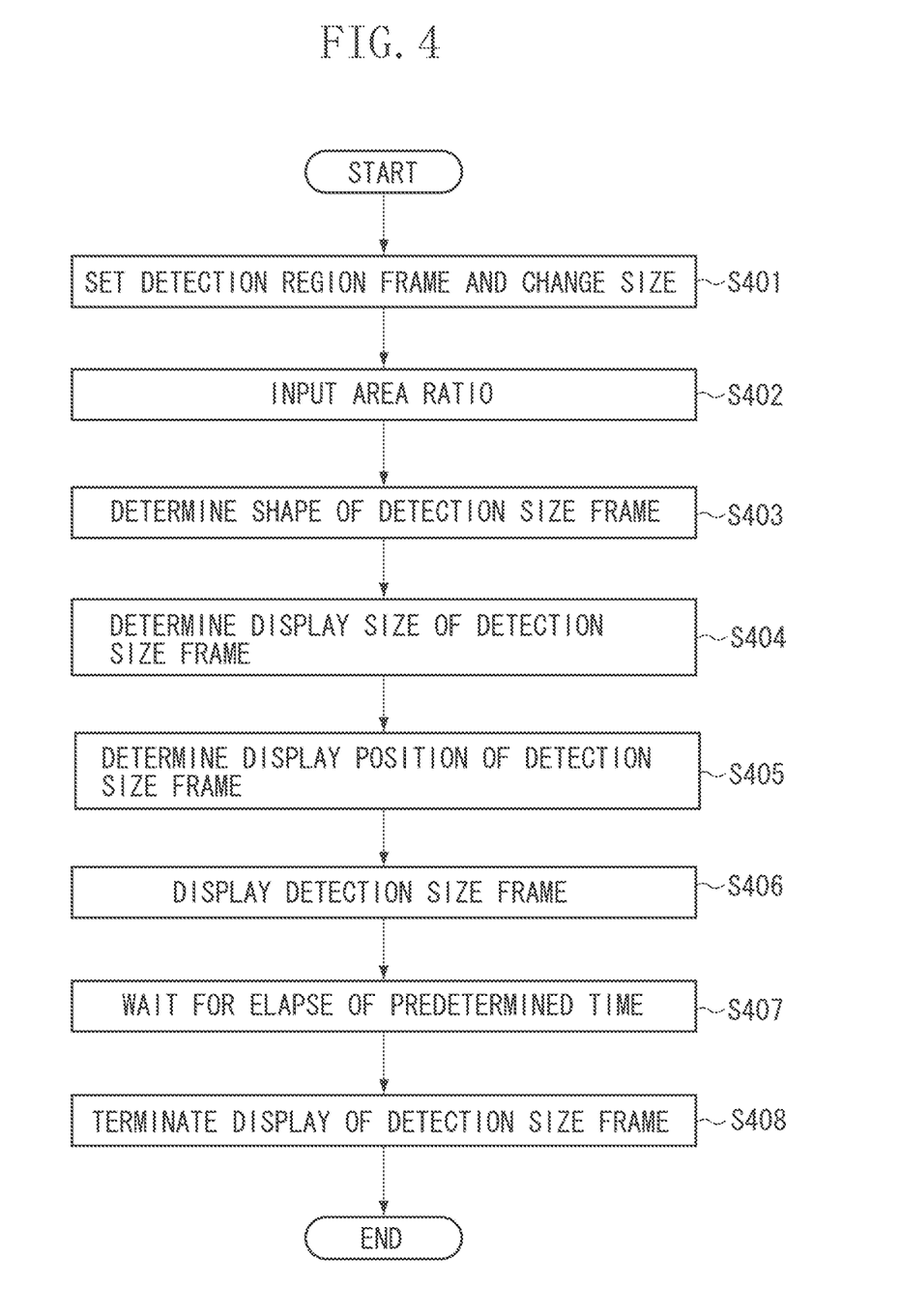
FIG. 4 is a flowchart illustrating display control processing according to the embodiment of the present invention.

FIG. 4 is a flowchart illustrating display control processing of the detection size frame 304 by the object detection function setting tool 101 according to the present embodiment. The object detection function setting tool 101 is a display control apparatus that displays video images from the network camera 103. The processing in FIG. 4 is executed by the CPU 201 reading and loading a program stored on the secondary storage device 202 into the RAM 203. However, at least a part of the processing in FIG. 4 may be performed by dedicated hardware.

In step S401 (setting procedure), the detection frame setting unit 112 sets (changes) an object detection region (detection region frame 303), according to an input from the input apparatus 206 (e.g., pointing device). In step S401, the detection frame setting unit 112 acquires an area of the detection region frame 303 that has been set (changed).

More specifically, when the user designates a new object detection region (the detection region frame 303) by using the input apparatus 206, the detection frame setting unit 112 acquires an area of the new detection region frame 303. For example, when the user drags the detection region frame 303 already set by using the input apparatus 206, the detection frame setting unit 112 changes a position or size of the detection region frame 303, and acquires the changed area thereof as well.

In step S402 (input procedure), the area ratio input unit 113 inputs a parameter of an area ratio input into the area ratio input field 305 in FIG. 3, into the size frame determination unit 114. That is, the area ratio input unit 113 inputs a parameter indicating a size of an area relative to an area of the object detection region (the detection region frame 303).

When a parameter in the area ratio input field 305 is changed in a case where the detection size frame 304 is already set, the area ratio input unit 113 inputs the parameter changed in step S402 into the size frame determination unit 114. In this case, the processing in step S401 can be omitted.

In step S403, the size frame determination unit 114 determines a shape of the detection size frame 304. The size frame determination unit 114 according to the present embodiment determines a shape of the video image display region 302 as a shape of the detection size frame 304. In other words, in a case where, for example, the video image display region 302 is a rectangle, the size frame determination unit 114 determines a rectangle with the same aspect ratio as that of the video image display region 302 as a shape of the detection size frame 304. Further, in a case where, for example, the video image display region 302 is a polygon or an ellipse or a circle instead of a rectangle, the size frame determination unit 114 determines these shapes as the shape of the detection size frame 304.

However, the present embodiment is not limited to this form, and the size frame determination unit 114 can also determine, for example, a shape of the detection region frame 303 as a shape of the detection size frame 304. Further, the size frame determination unit 114 can render a shape, which the user has designated, as a shape of the detection size frame 304, regardless of shapes of, for example, the video image display region 302 and the detection region frame 303. The size frame determination unit 114, when the user designates a shape of the detection size frame 304, can display plural shapes on a template, and allow the user to select a desired shape from among them.

In step S404 (determination procedure), the size frame determination unit 114, based on the area of the detection region frame 303 (the object detection region) acquired in step S401, and the parameter relating to the ratio input in step S402, determines size information of an object to be detected within the object detection region. The size frame determination unit 114 according to the present embodiment determines a product of the area of the object detection region and a parameter relating to the ratio, as an area of the detection size frame 304. For example, in a case where 25% is input into the area ratio input field 305, the size frame determination unit 114 determines an area obtained by multiplying the area of the object detection region by 0.25, as the area of the detection size frame 304.

If a parameter in the area ratio input field 305 is changed by using the input apparatus 206, the size frame determination unit 114 changes the area of the detection size frame 304 based on the changed parameter. That is, the size frame determination unit 114 changes the area of the detection size frame 304, according to the input of a change instruction of the ratio of a size of an area of an object to be detected to the area of the object detection region.

If an area of the object detection region is changed, by the input apparatus 206, the size frame determination unit 114 changes the area of the detection size frame 304 based on the changed area. That is, the size frame determination unit 114 changes the area of the detection size frame 304, according to the input of a change instruction of the area of the object detection region.

In step S405, the size frame determination unit 114 determines a display position of the detection size frame 304. The size frame determination unit 114 according to the present embodiment determines the display position of the detection size frame 304 to be in the middle of the video image display region 302. However, for example, the size frame determination unit 114 can also determine the display position of the detection size frame 304 to be in the middle of the detection region frame 303 (the object detection region). If the detection size frame 304 is displayed in the middle of the detection region frame 303, the size frame determination unit 114 causes the display position of the detection size frame 304 to move in a movement direction of the detection region frame 303, according to a movement of the detection region frame 303.

Also, the size frame determination unit 114 can determine a region designated in advance by the user input via the input apparatus 206, as the display position of the detection size frame 304. Furthermore, the size frame determination unit 114 can also change the display position once determined, based on the user input via the input apparatus 206.

In step S406 (display control procedure), the display control unit 111 causes figures (the detection size frame 304) of an area corresponding to the size information determined by the size frame determination unit 114 to be displayed on the video image. Further, the communication unit 110 of the object detection function setting tool 101 transmits detection setting information corresponding to the determinations in steps S403 and S404 to the network camera 103. More specifically, the communication unit 110 transmits a shape of the detection size frame 304 determined in step S403, and an area of the detection size frame 304 determined in step S404 to the network camera 103. If the detection size frame 304 is a rectangle, detection setting information is, for example, coordinate values of the rectangle.

The object detection unit 105 of the network camera 103 detects from a video image an object larger than an area notified from the object detection function setting tool 101. For example, if lightness values for each region having a predetermined size of consecutive frames are compared with each other, and a total of areas of adjacent regions where there is equal to or greater than a predetermined difference in the lightness values, is larger than a notified area, it is determined that an object exists in the region. Then, when the object detection unit 105 of the network camera 103 detects an object, the communication unit 106 transmits detected object information to the object detection function setting tool 101 and the client 120. The detected object information according to the present embodiment is composed of a video data number, an object number, and object position/size information. The video data number is information for identifying a frame where the object has been detected. The object number is information assigned to each object for identifying detected objects. The object position/size information is information indicating a position and size within the video image of the detected object. The object position/size information may be a position and size of the detection result display frame 306, or if the detection result display frame is a rectangle, may be coordinate values of the rectangle.

The object detection function setting tool 101 or the client 120, upon receiving detected object information, causes the detection result display frame 306 to be displayed on the video image. That is, the detection result display unit 115 in the object detection function setting tool 101 determines a display form (e.g., type of frame line and color) of the detection result display frame 306 according to reception of the detected object information. Then, the display control unit 111 in the object detection function setting tool 101 causes the detection result display frame 306 in the display form determined by the detection result display unit 115 to be displayed on the video image.

In step S407, the display control unit 111 determines whether a predetermined time has elapsed from the start of display of the detection size frame 304. If it is determined that the predetermined time has elapsed, the processing proceeds to step S408.

In step S408, the display control unit 111 terminates display of the detection size frame 304. More specifically, the display control unit 111 sets a figure to a non-display mode after a predetermined time has elapsed, since an area of the figure (the detection size frame 304) is changed according to the input of a change instruction (in step S401) of the detection region frame 303 and a change instruction (in step S402) of the area ratio. Even after the detection size frame 304 has been set to a non-display mode, the display control unit 111 causes the detection result display frame 306 to be displayed, according to reception of object detection information from the network camera 103.

As described above, the object detection function setting tool 101 according to the present embodiment sets the object detection region (detection region frame 303), and causes the area ratio input field 305 for inputting a parameter relating to the ratio of a size of an area of an object to be detected to the area of the object detection region to be displayed as well. Then, the object detection function setting tool 101 causes a figure (the detection size frame 304) of the area corresponding to size information determined based on the area of the object detection region and a parameter input into the area ratio input field 305 to be displayed on a screen.

In this way, the user becomes able to set by a simple operation an object to be detected, as well as to easily confirm the setting result.

In the present embodiment, descriptions with a focus on an example in which the object detection unit 105 in the network camera 103 detects an object have been given, but a configuration in which the object detection function setting tool 101 has an object detection unit is also possible. In this case, the object detection unit in the object detection function setting tool 101 detects an object larger than the detection size frame 304, and the display control unit 111 causes a detection result to be displayed.

In the present embodiment, an example of detecting an object larger than the area of the detection size frame 304 has been described. However, in addition to the area, it is also possible to perform detection of an object in consideration of a shape of the detection size frame 30. For example, by setting the detection size frame 304 in a vertically long shape, it is possible to detect standing human objects among a plurality of human objects.

Further, the present invention can be also realized by executing the following processing. That is, the processing for supplying software (program) that implements the functions of the above-described embodiment, via a network or various types of storage media to a system or an apparatus, and causing a computer (or CPU or micro-processing unit (MPU) or the like) of the system or the apparatus to read out and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-204365 filed Sep. 13, 2010, which is hereby incorporated by reference herein in its entirety.

What is claimed is:

1. A processing apparatus configured to output an event according to a result of comparison between a size of an object detected within an object detection region of a video image and a threshold value, the processing apparatus comprising:
   a setting unit configured to set the object detection region;
   an input unit configured to input a ratio between a size of the object detection region set by the setting unit and a limit size of an object to be detected;
   a determination unit configured to determine a size of a detection size figure as a threshold value corresponding to the limit size of an object to be detected in accordance with the input ratio; and
   a display control unit configured to cause a detection region figure indicating the object detection region, and the detection size figure with the determined size corresponding to the limit size of an object to be detected to be superimposed on the video image.

2. The processing apparatus according to claim 1, further comprising:
   an input unit configured to input a parameter indicating a size of an area of an object to be detected relative to the size of the object detection region,
   wherein the determination unit is configured to determine the threshold value based on an area of the object detection region and the input parameter.

3. The processing apparatus according to claim 1, further comprising:
   a changing unit configured to change the size of the object detection region,
   wherein the determination unit is configured to change the threshold value according to the changed size of the object detection region, and
   wherein the display control unit is configured to cause the detection size figure with a size corresponding to the changed threshold value to be displayed.

4. The processing apparatus according to claim 2, further comprising:
   a changing unit configured to change the parameter,
   wherein the determination unit is configured to change the threshold value according to the changed parameter, and
   wherein the display control unit is configured to cause the detection size figure with a size corresponding to the changed threshold value to be displayed.

5. The processing apparatus according to claim 1, wherein the display control unit is configured, when a predetermined time has elapsed from a start of displaying of the detection size figure, to cause the detection size figure to not be displayed.

6. The processing apparatus according to claim 1, wherein the display control unit is configured, in the case that movement of the object detection region occurs, to cause a display position of the detection size figure to move in a direction of the movement of the object detection region.

7. The processing apparatus according to claim 1, wherein the display control unit is configured to cause a rectangle with an aspect ratio of the object detection region to be displayed as the detection size figure.

8. The processing apparatus according to claim 1, wherein the display control unit is configured to cause a rectangle with an aspect ratio of a display region of the video image to be displayed as the detection size figure.

9. The processing apparatus according to claim 1, further comprising:
   a designation unit configured to designate a shape of the detection size figure.

10. The processing apparatus according to claim 1, further comprising:
    an object detection unit configured to detect an object with a video image size larger than the detection size figure.

11. A processing apparatus configured to output an event according to a result of comparison between a size of an object detected within an object detection region of a video image and a threshold value, the processing apparatus comprising:
    a setting unit configured to set the object detection region;
    a determination unit configured to determine the threshold value based on a size of the set object detection region;
    a display control unit configured to cause a detection region figure indicating the object detection region, and a detection size figure with a size corresponding to the determined threshold value to be superimposed on the video image; and
    a second determination unit configured to determine whether a camera for acquiring a video image is installed on a ceiling or on a wall,
    wherein the display control unit is configured to cause the detection size figure to be displayed in different shapes depending on the determination result of the second determination unit.

12. A processing method of a processing apparatus configured to output an event according to a result of comparison between a size of an object detected within an object detection region of a video image and a threshold value, the processing method comprising:

setting the object detection region;

inputting a ratio between a size of the object detection region set by the setting unit and a limit size of an object to be detected determining a size of a detection size figure as a threshold value corresponding to the limit size of an object to be detected in accordance with the input ratio; and causing a detection region figure indicating the object detection region, and the detection size figure with the determined size corresponding to the limit size of an object to be detected to be displayed superimposed on the video image.

13. The processing method according to claim 12, further comprising:

inputting a parameter indicating a size of an area relative to a size of the object detection region; and determining the threshold value based on an area of the object detection region and the input parameter.

14. The processing method according to claim 12, further comprising:

causing, in the case that movement of the object detection region occurs, a display position of the detection size figure according to a movement of the object detection region to move in a direction of the movement of the object detection region.

15. The processing method according to claim 12, further comprising:

causing a rectangle with an aspect ratio of the object detection region to be displayed as the detection size figure.

16. A computer-readable non-transitory storage medium storing a program which, when executed on a device, causes the device to execute the method according to claim 12.

17. A display system comprising:

an output unit configured to output an event according to a result of comparison between a size of an object detected within an object detection region of a video image and a threshold value;

a setting unit configured to set the object detection region;

an input unit configured to input a ratio between a size of the object detection region set by the setting unit and a limit size of an object to be detected;

a determination unit configured to determine a size of a detection size figure as a threshold value corresponding to the limit size of an object to be detected in accordance with the input ratio; and a display control unit configured to cause a detection region figure indicating the object detection region, and the detection size figure with the determined size corresponding to the limit size of an object to be detected to be superimposed on the video image.

* * * * *